July 14, 1964 A. MACOVSKI 3,141,064

AUTOMATIC CHROMA CONTROL FROM CHROMA SIGNAL

Filed Feb. 12, 1962 5 Sheets-Sheet 1

INVENTOR.
ALBERT MACOVSKI
BY
W. H. Sprague
ATTORNEY

July 14, 1964 A. MACOVSKI 3,141,064

AUTOMATIC CHROMA CONTROL FROM CHROMA SIGNAL

Filed Feb. 12, 1962 5 Sheets-Sheet 2

INVENTOR.
ALBERT MACOVSKI
BY
W. A. Sponagle
ATTORNEY

July 14, 1964 A. MACOVSKI 3,141,064

AUTOMATIC CHROMA CONTROL FROM CHROMA SIGNAL

Filed Feb. 12, 1962 5 Sheets-Sheet 3

INVENTOR.
ALBERT MACOVSKI
BY
W. H. Sprague
ATTORNEY

July 14, 1964 A. MACOVSKI 3,141,064

AUTOMATIC CHROMA CONTROL FROM CHROMA SIGNAL

Filed Feb. 12, 1962 5 Sheets-Sheet 4

INVENTOR.
ALBERT MACOVSKI
BY
W. H. Sprague
ATTORNEY

July 14, 1964 A. MACOVSKI 3,141,064

AUTOMATIC CHROMA CONTROL FROM CHROMA SIGNAL

Filed Feb. 12, 1962 5 Sheets-Sheet 5

INVENTOR.
ALBERT MACOVSKI
BY W. H. Sprague
ATTORNEY

United States Patent Office 3,141,064

Patented July 14, 1964

3,141,064

AUTOMATIC CHROMA CONTROL FROM CHROMA SIGNAL

Albert Macovski, Palo Alto, Calif., assignor to Radio Corporation of America, a corporation of Delaware Filed Feb. 12, 1962, Ser. No. 172,485
9 Claims. (Cl. 178—5.4)

This invention relates to color television image reproducing apparatus and particularly to apparatus for automatically controlling the subjective color quality of the reproduced images.

The color television system presently standardized in the United States employs a composite video signal including a luminance component and a chrominance component. The luminance component is of the same general type as that used in black and white television systems and has a frequency band from a relatively low frequency to about 4 mc. per second. The chrominance component is a subcarrier wave which is modulated in phase to represent hue and in amplitude to represent color intensity. The chrominance component occupies a smaller frequency band than the luminance component and this smaller band is located at the high frequency end of the luminance component frequency band.

The difference in frequencies between the luminance and chrominance components may, at a given receiving location, result in the relative amplitudes of the two components being changed when the composite signal is transmitted over the air because frequency selective attenuations may exist in the transmission paths. Such a change in relative amplitudes of the luminance and chrominance components may result in the reproduction of a color image with color and contrast values which are not optimum.

As transmitted, the composite color television signal has, in addition to the luminance and chrominance components previously mentioned, horizontal deflection synchronizing pulses and color synchronizing bursts of the color subcarrier wave. The horizontal synchronizing pulses and the subcarrier bursts are transmitted with certain specified amplitudes relative to one another. The horizontal synchronizing pulses have a repetition rate of approximately 15,750 cycles per second and the color bursts have the color subcarrier wave frequency of approximately 3.58 mc. per second. Thus, the relative amplitudes of the horizontal synchronizing pulses and the color synchronizing bursts in the received signal, indicate the nature and extent of any frequency selective effects in the transmission path upon the chrominance component. They likewise indicate any variation in the chrominance component which may occur between television stations.

Previously, where the subjective color quality of the reproduced images has been effected by means automatically responsive to receive signals, it has been the practice that the carrier wave amplifier (e.g., RF and/or IF) circuits which process both the luminance and chrominance components have been gain controlled by conventional AGC means responsive to the amplitude of the horizontal synchronizing pulses. In such systems, the proper relationship between the luminance and chrominance components has been maintained by gain controlling those amplifiers which process substantially only the chrominance component as a function of the amplitude of the color synchronizing bursts. In these systems, it has been impractical to effect all of the gain control of the chrominance amplifier by the automatic means because of variations in amplitude in the ratio of the color synchronizing bursts to the horizontal synchronizing pulses as the receiver was switched from one transmitting station to another. Hence, in such receivers, it has been the practice also to include as a manual control of the chrominance amplifier gain one which has a relatively wide range of adjustment, thereby making the adjustment of such control somewhat critical.

It, therefore, is an object of the present invention to provide an automatic gain control of the chrominance amplifier in a color television receiver which is reliable for subjective color quality control over a sufficiently wide range as to enable a material reduction of the range of any manual gain control of the chrominance amplifier or the entire elimination of such manual control.

The present invention takes advantage of the fact that most color television subject matter is of such a character that the chrominance component has peaks of sufficient amplitude to enable the use of these peaks for gain control of the chrominance amplifier. In such a system, peaks of the chrominance component are detected to provide a control signal which is used to automatically control the gain of the chrominance amplifier so as to maintain the proper relationship between the chrominance and luminance components of the received signal so that these components may be used to reproduce a color television image in which good subjective color quality is maintained.

An auxiliary feature of the present invention which may be useful in those relatively few instances in which the subject matter has such low saturation that peaks of insufficient amplitude are present in the chrominance component for proper use as an automatic gain control of the chrominance amplifier. In order to prevent the automatic control system from producing an oversaturated picture in such cases, the system provides for the automatic gain control apparatus to respond alternatively to the amplitude of the color synchronizing bursts as a minimum chrominance component peak, thereby preventing oversaturation of the reproduced image.

For a better understanding of the invention, reference may be had from the following description taken in connection with the accompanying drawings, of which:

Figure 1:
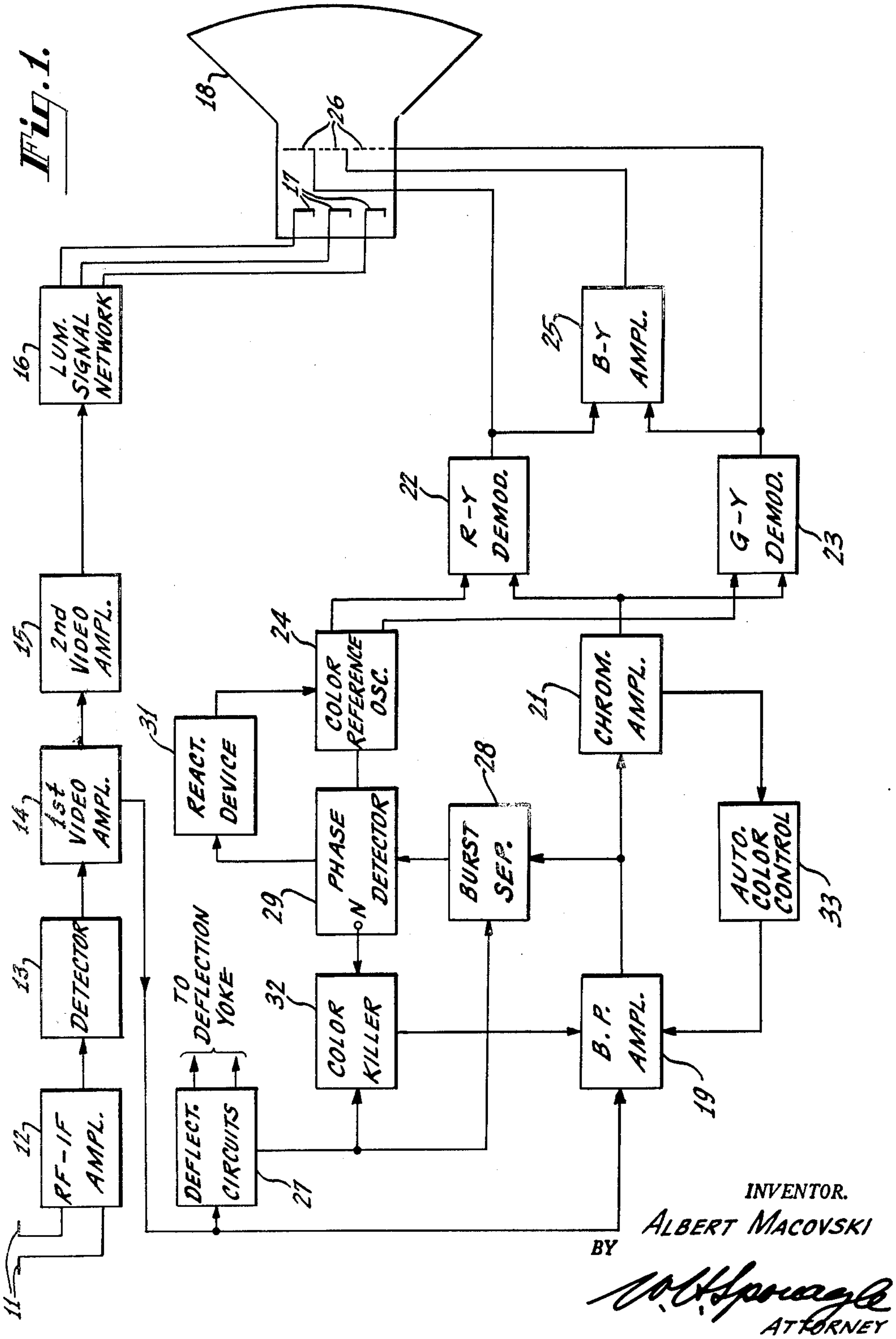
FIGURE 1 is a block diagram of a color television receiver which may be employed to reproduce a color image and which embodies one form of the present invention.
Figure 4:
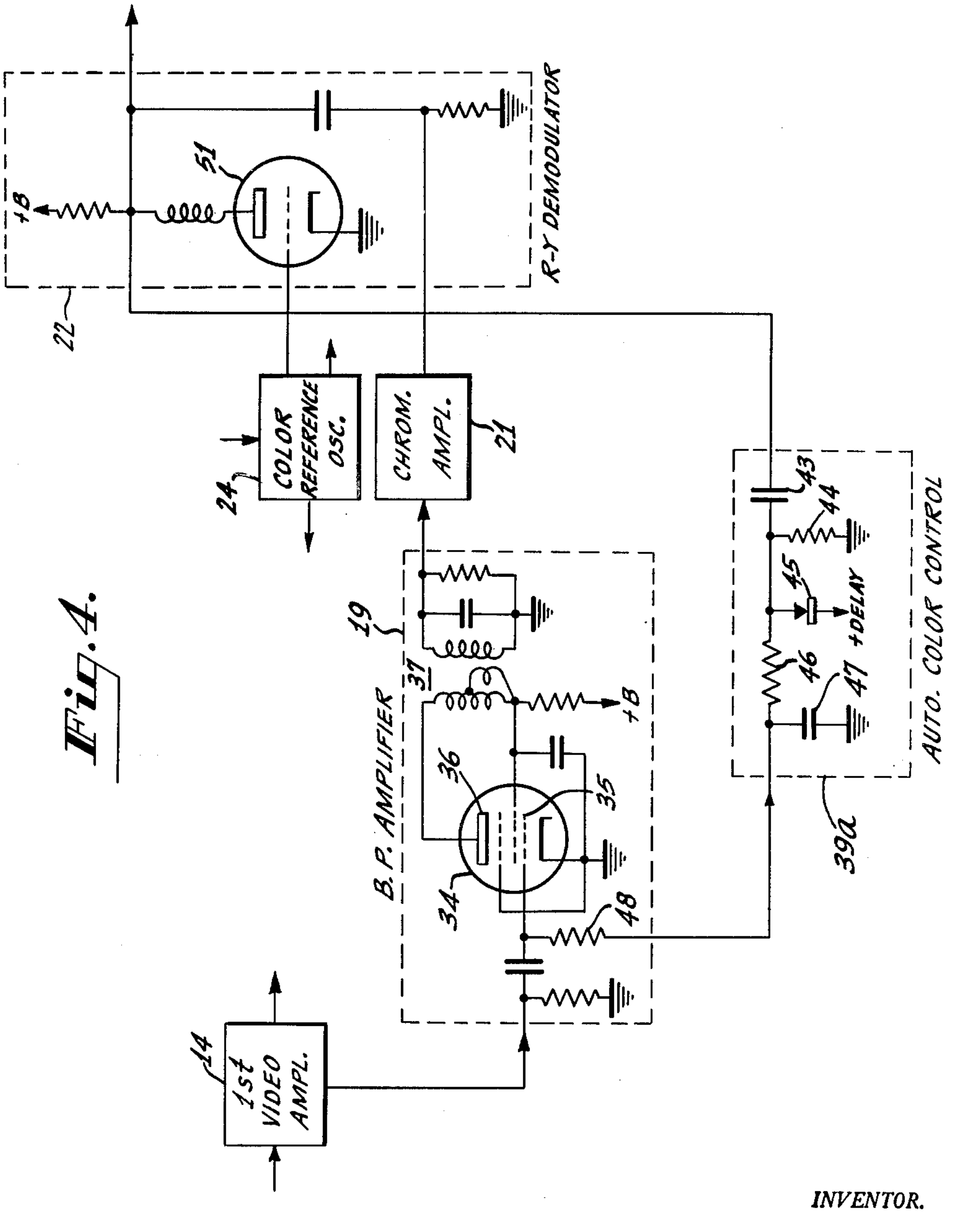
Figure 5:
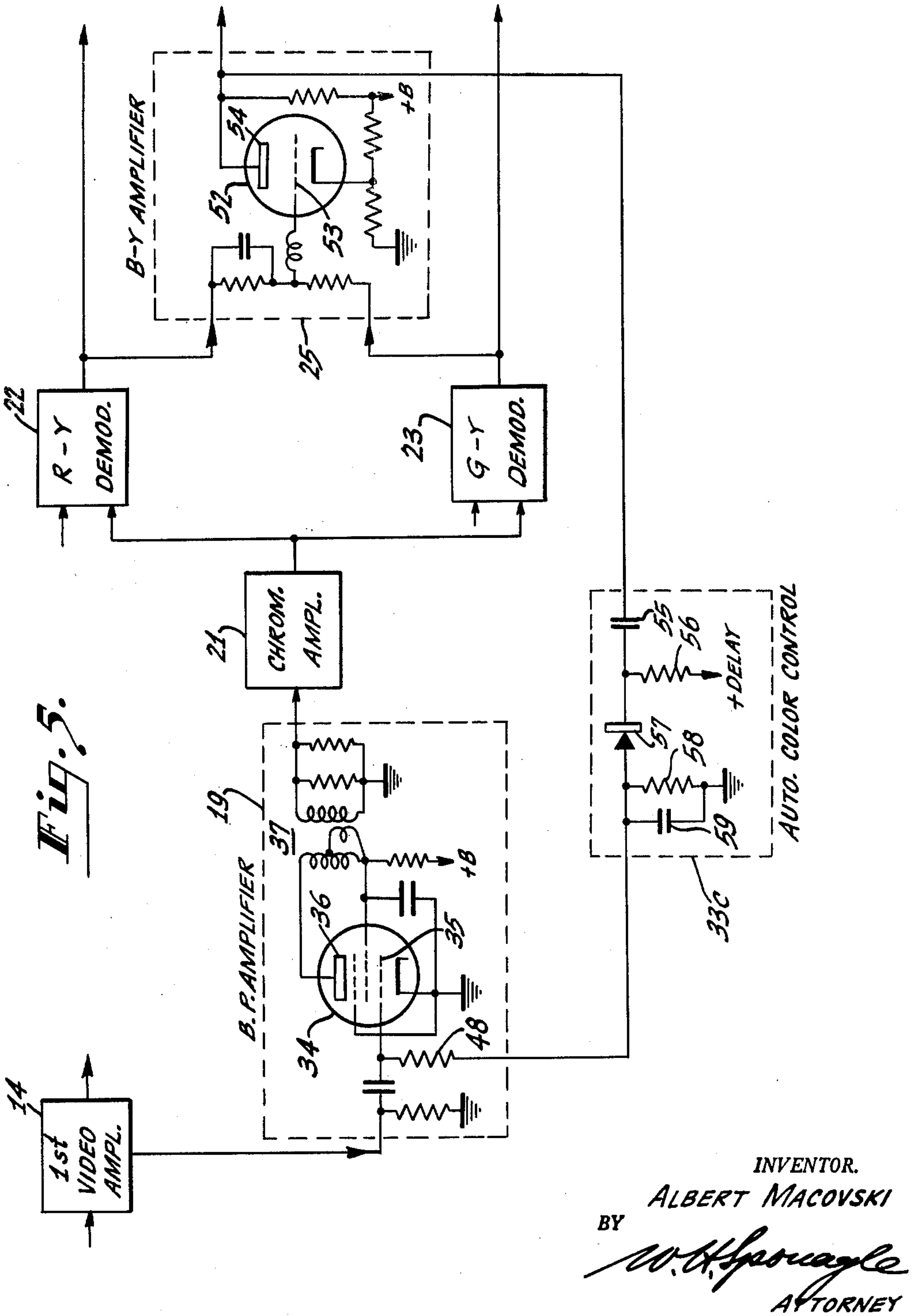

FIGURE 4 is a schematic circuit diagram of a part of the color television receiver of FIGURE 1 illustrating the details of still another form of the invention wherein the peaks of one of the color difference signals is used to control the gain of a chrominance amplifier; and FIGURE 5 is a schematic circuit diagram of a part of the color television receiver of FIGURE 1 illustrating the details of a further form of the invention in which the gain of a chrominance amplifier is controlled by a color difference signal bearing such a phase relationship to the color synchronizing bursts that the bursts serve to control the chrominance amplifier gain when the peaks of the color television signal are of relatively low amplitude.

Reference first is made to FIGURE 1. The composite color television signal received by an antenna 11 is processed in the RF and IF amplifiers 12 and in the detector 13 to produce a composite video signal comprising luminance and chrominance components, deflection synchronizing pulses and color synchronizing bursts. The composite video signal is amplified by a first video amplifier 14. At least the luminance component is further amplified by a second video amplifier 15 and is impressed upon a luminance signal network 16 in which it is suitably processed in a conventional manner to produce three separate luminance components which may have different amplitudes. These luminance signals are impressed respectively upon the cathodes 17 of the red, green and blue electron guns of a tricolor kinescope 18. Such a kinescope may be a shadow mask color kinescope such as the 21AXP22, the 21CYP22A, the 21FBP22 or the 21FJP22, all of which are presently used in color television receivers.

The chrominance component of the composite video signal is separated by a bandpass amplifier 19 coupled to an output of the first video amplifier 14 as is customary. The amplifier 19 responds substantially only to that portion of the composite signal including the color subcarrier and its modulation sidebands comprising the chrominance component. The output of the bandpass amplifier is coupled through a chrominance amplifier 21 to $R-Y$ and $G-Y$ color difference signal demodulators 22 and 23, respectively. These demodulators receive suitable phases of a demodulating color reference wave from a color reference oscillator 24 to produce $R-Y$ and $G-Y$ color difference signals. These color difference signals derived from the color demodulators 22 and 23 are suitably combined in a $B-Y$ amplifier 25 to produce a $B-Y$ color difference signal. The red, green and blue color difference signals ($R-Y$, $G-Y$ and $B-Y$ respectively) which are derived respectively from the $R-Y$ and $G-Y$ demodulators 22 and 23 and from the $B-Y$ amplifier 25 are impressed upon the control grids 26 of the color kinescope 18. By means of the luminance signals impressed upon the cathodes and the color difference signals impressed upon the control grids of the three electron guns of the color kinescope the electron beams are modulated suitably to represent the red, green and blue color components of the image to be reproduced.

The deflection synchronizing pulses of the received composite signal are employed to control deflection of the electron beams of the color kinescope 18 in a conventional manner. This is accomplished by coupling the usual deflection circuits 27 to an output of the first video amplifier 14 for the derivation of the synchronizing pulses. The deflection circuits utilize these pulses in a conventional manner to energize the deflection yoke (not shown) provided for the color kinescope.

The output of the bandpass amplifier 19 also is coupled to a burst separator 28 which functions under the control of keying pulses derived from the deflection circuits 27 to separate the color synchronizing bursts from the composite signal. These bursts are impressed upon a phase detector 29 together with the color reference wave derived from the color reference oscillator 24. Any deviation in phase of the color reference wave from the bursts is detected and used to bring the reference wave oscillations into phase by means of a reactance device 31 coupled between the phase detector 29 and the frequency and phase controlling circuits of the color reference oscillator 24.

The color television receiver of FIGURE 1 also includes a color killer 32 which functions in the absence of a color synchronizing burst of at least a minimum amplitude to bias off the bandpass amplifier 19 so that any signals impressed upon its input circuit are not reproduced in its output circuit and transferred to the chrominance amplifier 21 and burst separator 28. This color killer function is accomplished by a connection to the phase detector 29 at a point which produces a negative unidirectional voltage at terminal N when color synchronizing bursts of at least a minimum amplitude are received. In the absence of such synchronizing bursts, the color killer 32 functions to disable the bandpass amplifier 19 as described.

In order to detect the recurrence of color synchronizing bursts of at least a minimum amplitude after the color killer 32 has disabled the bandpass amplifier 19, the color killer is connected to the deflection circuits 27 from which it receives keying pulses occurring during the horizontal blanking intervals. In such a manner the color killer 32 is momentarily conditioned during the burst intervals to render the bandpass amplifier 19 operative to reproduce any such bursts in its output circuit. In this manner, the circuit may be returned to its normal operating state for the reception of a color television signal after having been rendered inoperative for the purpose of responding only to a received black and white signal, for example.

The components of the color television receiver represented in FIGURE 1 described up to this point are those usually found in a color television receiver such as that described in Color Television Service Data—1955 No. T5—published by RCA Service Company, a division of Radio Corporation of America, Camden 8, New Jersey. Also these components function in their customary manners.

The receiver of FIGURE 1 also includes an automatic color control 33 which, in one form of the invention, may be coupled to the chrominance amplifier 21 for response to peaks of the chrominance component of the received composite color television video signal so as to produce a control signal representative of the amplitude of the chrominance component peaks. The automatic color control 33 is coupled also to the bandpass amplifier 19 so as to impress this control signal upon the gain controlling circuits of the amplifier. By such an arrangement the bandpass amplifier 19 is made to function so as to maintain a substantially constant level of the chrominance component, thereby effecting the desired color saturation control of the reproduced image.

Figure 2:
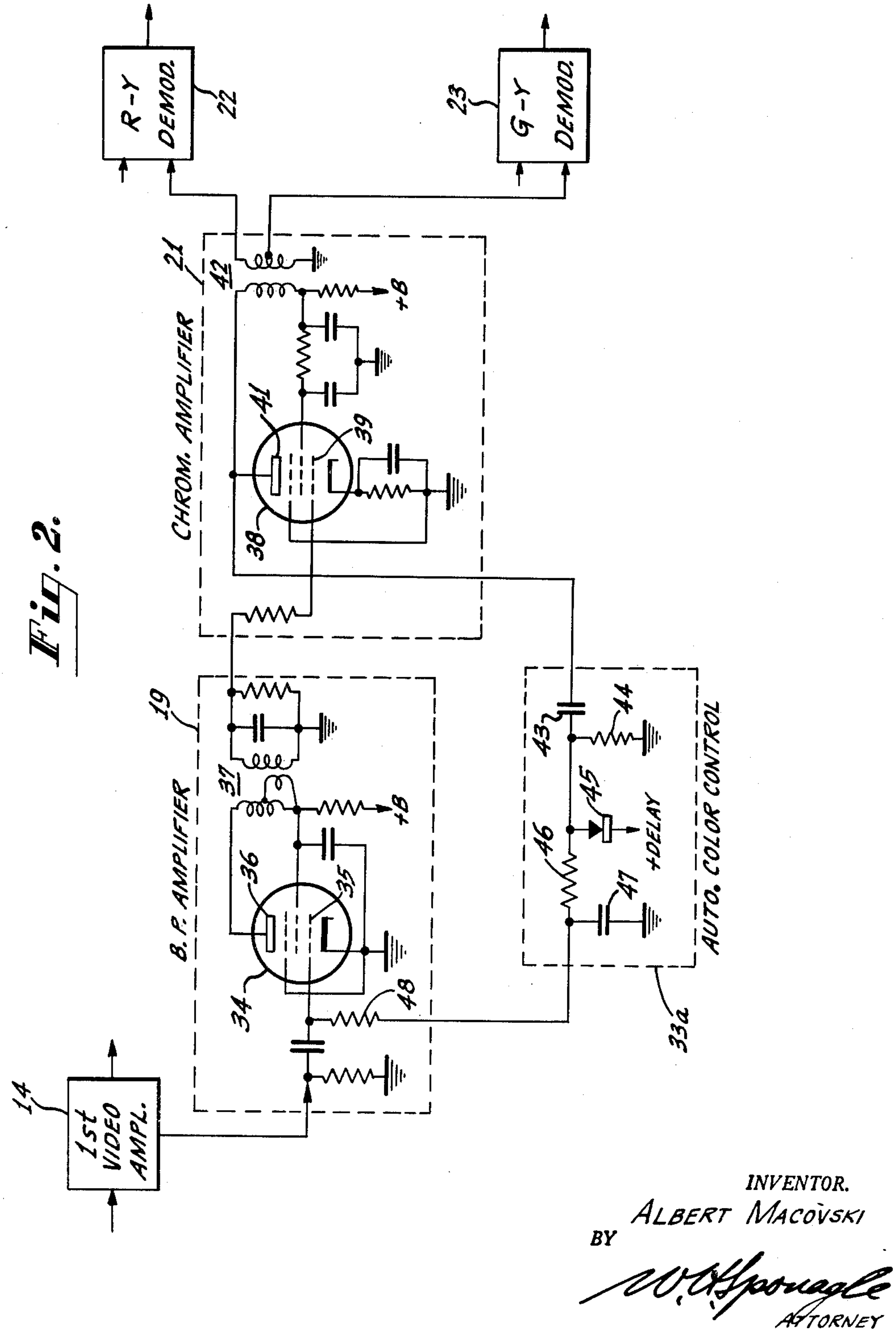
FIGURE 2 is a schematic circuit diagram of a part of the color television receiver of FIGURE 1 illustrating the details of one form of the present invention wherein the chrominance component of the received composite television signal is employed to control the gain of a chrominance amplifier.

For a more detailed description of the circuits and their operation in one of several typical disclosed embodiments of the invention for automatically controlling the gain of the chrominance component channel in response to chrominance component peaks, reference now is made to FIGURE 2. The bandpass amplifier 19 includes an electron tube 34 the control grid 35 of which is coupled to the output of the first video amplifier 14 and the anode 36 of which is connected to an output transformer 37. The chrominance amplifier 21 includes an electron tube 38, the control grid 39 of which is connected to the output transformer 37 which serves to couple the output of the bandpass amplifier 19 to the input of the chrominance amplifier 21. The anode 41 of the chrominance amplifier tube 38 is connected to an output transformer 42 which is in turn connected to corresponding inputs of the $R-Y$ and $G-Y$ demodulators 22 and 23 respectively.

The anode 41 of the chrominance amplifier tube 38 also is coupled to the automatic color control 33*a* which is provided with an input circuit including a series capacitor 43 and a shunt resistor 44 to ground. The automatic color control 33*a* also includes a diode 45 one electrode of which is connected to the input circuit 43–44 and the other electrode of which is connected to a source of positive delay voltage as indicated. The output circuit of the automatic color control includes a series resistor 46 and a shunt capacitor 47 the junction point of which is connected to the control grid 35 of the bandpass amplifier 19 through an isolating resistor 48.

The bandpass amplifier 19 functions to amplify substantially only the chrominance video component of the composite signal derived from the first video amplifier 14. The chrominance video component is further amplified by the chrominance amplifier 21 for impression upon and use by the demodulators 22 and 23.

The amplified chrominance video component derived from the anode 41 of the chrominance amplifier tube 38 is peak detected by means including the diode 45 of the automatic color control 33*a* and the detected peaks are effectively filtered by the output circuit 46–47 to provide a substantially unidirectional gain controlling signal for impression upon the control grid 35 of the bandpass amplifier tube 34. The magnitude of the gain controlling signal varies in accordance with the magnitude of the chrominance component peaks so as to inversely control the gain of the bandpass amplifier tube 34 in a manner similar to that of conventionl AGC systems. The delay voltage impressed upon the diode 45 of the automatic color control 33*a* is so chosen that the automatic color control apparatus functions only in response to peaks of the chrominance component exceeding a predetermined level or threshold much in the same manner as general purpose delayed AGC systems operate.

Figure 3:
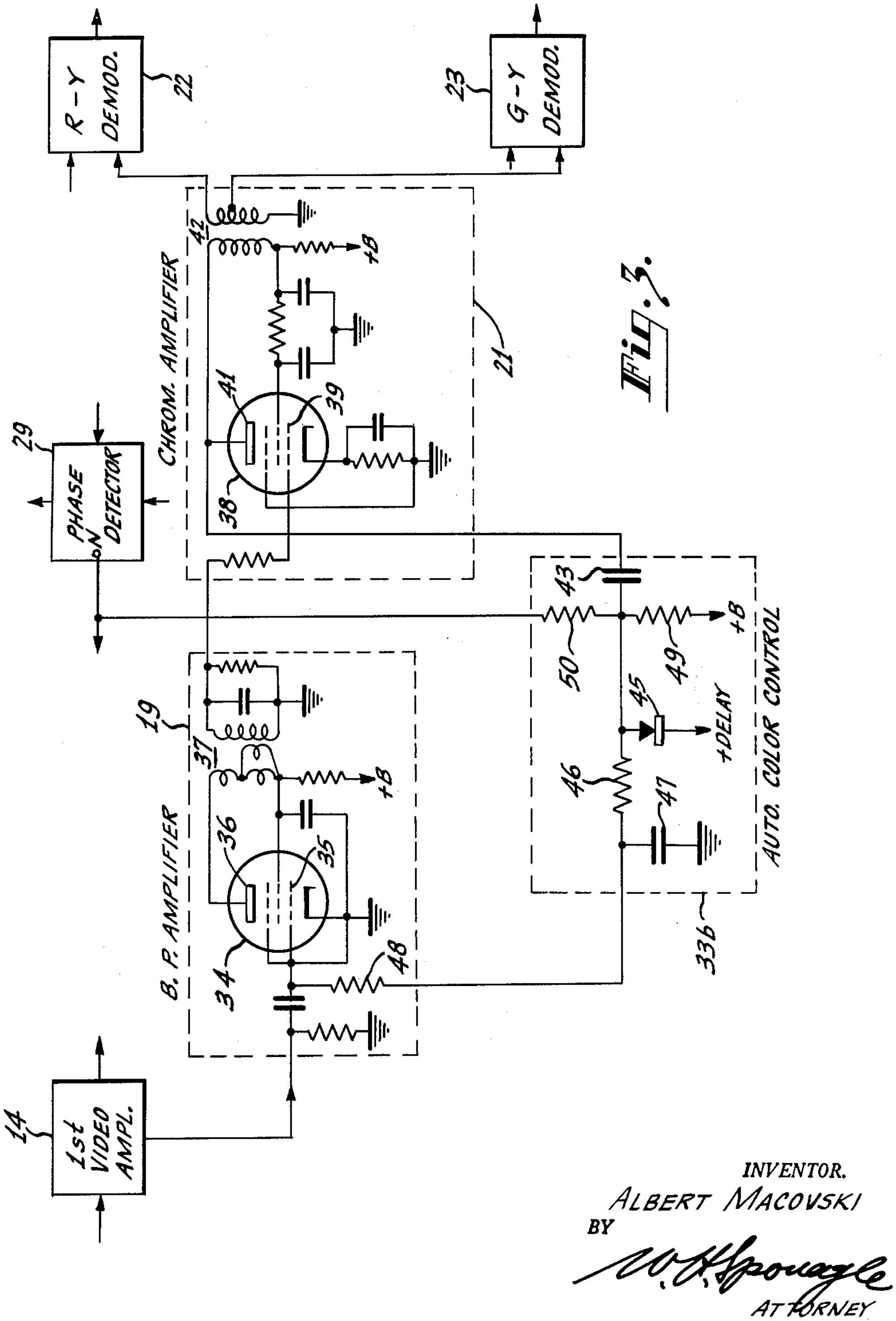
FIGURE 3 is a schematic circuit diagram of a part of the color television receiver of FIGURE 1 illustrating the details of another form of the invention wherein the color synchronizing burst is used to control the gain of a chrominance amplifier when the use of the chrominance component peaks would cause oversaturation of the reproduced image.

Apparatus such as that shown in and described with reference to FIGURE 2 will tend to so increase the gain of the bandpass amplifier 19 in response to the chrominance video signal component representing images of low saturation as to effect the reproduction of such images with higher saturation than desired. Accordingly, an auxiliary feature of the present invention which will prevent, or at least minimize, such undesired operation is shown in FIGURE 3 to which reference now is made. The arrangement of the band pass amplifier 19 and the chrominance amplifier 21 in relation to one another and with the $R-Y$ and $G-Y$ demodulators 22 and 23 respectively are the same as in the previously described apparatus of FIGURE 2. Also, the automatic color control 33*b* includes a peak rectifier diode 45 and an output circuit including resistor 46 and capacitor 47. In this case, the input circuit includes a series capacitor 43 and a shunt arranged resistor 49 connected to a source of positive potential. Also, the input circuit includes a resistor 50 connected between the diode 45 and the negative terminal N of the phase detector 29.

The automatic color control 33*b* functions as before in response to peaks of the chrominance component derived from the chrominance amplifier 29 to effect the desired gain control of the bandpass amplifier 19. This type of operation is achieved so long as the chrominance components peaks are of sufficient amplitude to effectively override the positive delay voltage applied to the detector diode 45. When the chrominance components peaks are not large enough in amplitude to overcome the delay voltage, the diode 45 becomes inoperative. However, the phase detector 29 which is of the type shown in the service data referred to previously includes a pair of diodes which effectively rectify the color synchronizing bursts impressed thereon to produce positive and negative voltages. The amplitude of the bursts does not change with picture content but may change relative to the amplitude of the deflection synchronizing pulses as previously indicated. The negative voltage derived from the terminal N is impressed upon the automatic color control 33*b* through the resistor 50 and is effective to produce in the output circuit 46–47 a unidirectional gain controlling signal suitable to control the gain of the bandpass amplifier 19 so as to prevent the system for producing undesired oversaturation of the reproduced image. The point at which the automatic color control 33*b* becomes unresponsive to the peaks of the chrominance component derived from the chrominance amplifier 21 and responsive to the detected color synchronizing bursts derived from the phase detector 29 is suitably controlled by proper selection of the +B and +delay potentials applied to the automatic color control apparatus.

The invention is not necessarily limited for use in receivers using relatively high level color demodulation as in the receiver covered by the service data previously referred to. In receivers using relatively low level color demodulation, the chrominance component may be amplified or a step-up transformer may be used to raise the level of the chrominance component sufficiently to provide an automatic color control system, such as disclosed in FIGURES 2 or 3, having relatively high loop gain. Another alternative is to use a single relatively high level color difference signal which may be derived from an amplifier of a demodulated color difference signal in a receiver employing relatively low level color demodulation or directly from a high level demodulator.

Such an embodiment of the invention is disclosed in FIGURE 4 to which reference now is made. In the illustrated case, the relatively high level color difference signal is derived directly from one of the relatively high level demodulators used in the receiver covered by the service data previously referred to. It will be understood that the same arrangement may be used with one of the demodulated color difference signal amplifiers in a receiver using relatively low level color demodulation.

In this example, the $R-Y$ demodulator 22 is employed for the derivation of the automatic color control of the receiver. This demodulator includes an electron tube 51 which receives the chrominance component from the chrominance amplifier 21 and the proper phase of the color reference wave from the color reference oscillator 24. The demodulator functions to produce the $R-Y$ color difference signal in its anode circuit for impression upon the color kinescope 18 of FIGURE 1. The anode circuit of the tube 51 also is coupled to the automatic color control 33*a* which may be the same as that shown in and described with reference to FIGURE 2.

In this case, the automatic color control 33*a* responds to peaks of the $R-Y$ color difference signals and accordingly controls the gain of the bandpass amplifier 19 in the manner described. Such an arrangement has been operated with some success although the automatic color control is not as unvarying as in a system such as that described with reference to FIGURES 2 and 3 where peaks of the entire chrominance video signal component are used. Also, the arrangement of FIGURE 4 may be used in conjunction with the auxiliary feature of FIGURE 3 wherein the color synchronizing burst is relied upon for automatic color control when the $R-Y$ color difference signal peaks do not exceed a predetermined minimum value.

FIGURE 5, to which reference now is made, shows still another arrangement for utilizing the peaks of another one of the color difference signals for automatic color control. In this embodiment of the invention, the $B-Y$ color difference amplifier 25 includes an electron tube 52 for combining in suitable proportions the color difference signals derived from the $R-Y$ and $G-Y$ demodulators 22 and 23 respectively. The outputs of the demodulators 22 and 23 are coupled to the control grid 53 of the tube 52 so as to impress suitable proportions of the red and green color difference signals upon the tube to produce a blue color difference signal $B-Y$ in the output circuit connected to the anode 54.

The anode circuit of the tube 54 is coupled to the automatic color control 33*c* which is provided with an input circuit including a series capacitor 55 and a shunt resistor 56 connected to a positive source of delay potential. The automatic color control also includes a series-connected diode 57 and an output circuit comprising a shunt arrangement of a resistor 58 and a capacitor 59 connected to ground. This output circuit, as in the other illustrated forms of the invention, is coupled to the control grid 35 of the bandpass amplifier 19 to control its gain.

As previously indicated, the present invention is designed for inclusion in a color television receiver operating in accordance with the standards set by the Federal Communications Commission. These standards require the use of a chrominance video component such that the red and blue color difference signals $R-Y$ and $B-Y$ are represented in the color subcarrier wave by signals which have phases differing from the phase of the color synchronizing bursts by substantially odd and even multiples respectively of 90° (viz., 90° for $R-Y$ and 180° for $B-Y$). Likewise, the green color difference signal $G-Y$ is represented in the color subcarrier wave by a signal having a phase differing from the phase of the burst by an amount substantially different from a multiple of 90° (viz., approximately 304°).

In the color television receiver represented by the service data previously referred to, the blue color difference signal $B-Y$ is produced by effectively matrixing suitable amplitudes and polarities of the red and green color difference signals derived from the respective demodulators 22 and 23. The $B-Y$ amplifier 25 performs this matrixing function. It is seen that, by reason of the 180° phase relationship between the blue color difference signal $B-Y$ and the color synchronizing bursts, a negative version of the $B-Y$ signal contains both the blue color difference signal and the burst. Hence, suitable rectification of the negative version of the $B-Y$ signal by the diode 57 of the automatic color control 33c is effective to automatically control the gain of the band-pass amplifier tube 34 by peaks of the blue color difference signal exceeding a threshold, determined by the delay potential to which the input resistor 56 of the automatic color control 33c is connected, and to effect this gain control in response to the color synchronizing bursts when the blue color difference signal peaks do not exceed this threshold.

The present invention has been used successfully in a receiver such as that referred to in the previously mentioned service data after first disabling the automatic color control provided in that receiver. It was found that it was possible to at least so limit the range of any manual chroma control as to require it to compensate only for minor variations resulting from particular settings of the contrast and brightness controls. Hence, the manual chroma control was materially less critical in its adjustment than in systems using only the color synchronizing bursts for automatic color control. It also was found that any tendency for the system using the present invention to be sensitive to the color content of the subject matter was not particularly objectionable with respect to the subjective color quality of the reproduced images.

What is claimed is:

1. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

a chrominance signal channel for processing substantially only said chrominance video signal component and including a chrominance component amplifier;

an automatic color control circuit coupled to said chrominance signal channel for response to peaks of said chrominance video signal to produce a gain controlling signal varying in amplitude in accordance with variations of the magnitude of said chrominance signal peaks;

and means for impressing said gain controlling signal upon said amplifier to automatically control its gain inversely to said variations of the magnitude of said chrominance signal peaks.

2. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

first and second chrominance video signal amplifiers for amplifying substantially only said chrominance video signal component;

an automatic color control circuit coupled for response to the output of said second amplifier, and including rectifier means to convert peaks of said chrominance video signal component into a gain controlling signal;

and means for impressing said gain controlling signal upon said first amplifier to automatically control its gain.

3. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

a chrominance signal channel for processing substantially only said chrominance video signal component, and including a chrominance component amplifier and means for producing a color difference signal from said chrominance component;

an automatic color control circuit coupled to said color difference signal producing means for response to peaks of said color difference signal to produce a gain controlling signal;

and means for impressing said gain controlling signal upon said amplifier to automatically control its gain.

4. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

a chrominance signal channel for processing substantially only said chrominance video signal component, and including a chrominance component amplifier and a demodulator for deriving a color difference signal from said chrominance component;

an automatic color control circuit coupled to said demodulator for response to peaks of said color difference signal to produce a gain controlling signal;

and means for impressing said gain controlling signal upon said amplifier to automatically control its gain.

5. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

means including a phase detector responsive to said color synchronizing bursts to maintain proper color synchronization and phase of said receiver with respect to the chrominance component of said received signal, said phase detector also functioning as a rectifier of said bursts;

a chrominance signal channel for processing substantially only said chrominance video signal component and including a chrominance component amplifier;

an automatic color control circuit operative to produce a gain controlling signal and including rectifier means;

means for impressing said gain controlling signal upon said amplifier to automatically control its gain;

means coupling said automatic color control circuit to said chrominance signal channel to receive said chrominance component;

means biasing said rectifier means for operation to convert peaks of said chrominance component above a threshold value into said gain controlling signal;

and means coupling said automatic color control circuit to the burst rectifier of said phase detector to receive rectified bursts, thereby rendering said color control circuit operative to convert said rectified bursts into said gain controlling signal when peaks of said chrominance component do not exceed threshold value.

6. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

means including a phase detector responsive to said color synchronizing bursts to maintain proper color synchronization and phase of said receiver with respect to the chrominance component of said received signal, said phase detector also functioning as a rectifier of said bursts;

first and second chrominance video signal amplifiers for amplifying substantially only said chrominance video signal component;

an automatic color control circuit operative to produce a gain controlling signal and including rectifier means;

means for impressing said gain controlling signal upon said first amplifier to automatically control its gain;

means coupling said automatic color control circuit to the output of said second amplifier to receive said chrominance component;

means biasing said rectifier means for operation to convert peaks of said chrominance component above a threshold value into said gain controlling signal;

and means coupling said automatic color control circuit to the burst rectifier of said phase detector to receive rectified bursts, thereby rendering said color control circuit operative to convert said rectified bursts into said gain controlling signal when peaks of said chrominance component do not exceed said threshold value.

7. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

a chrominance component amplifier for amplifying substantially only said chrominance video signal component;

means coupled to said amplifier for producing a color difference signal having a phase which differs from the phase of said bursts by substantially a multiple of ninety degrees;

an automatic color control circuit coupled to said color difference signal producing means for response to peaks of said produced color difference signal to develop a gain controlling signal;

and means for impressing said gain controlling signal upon said amplifier to automatically control its gain.

8. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

a chrominance component amplifier for amplifying substantially only said chrominance video signal component;

means coupled to said amplifier for producing a color difference signal having a phase which differs from the phase of said bursts by substantially an odd multiple of ninety degrees;

an automatic color control circuit coupled to said color difference signal producing means for response to peaks of said produced color difference signal to develop a gain controlling signal;

and means for impressing said gain controlling signal upon said amplifier to automatically control its gain.

9. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

a chrominance component amplifier for amplifying substantially only said chrominance video signal component;

means coupled to said amplifier for producing a color difference signal having a phase which differs from the phase of said bursts by substantially an even multiple of ninety degrees;

an automatic color control circuit coupled to said color difference signal producing means for response to peaks of said produced color difference signal to develop a gain controlling signal;

and means for impressing said gain controlling signal upon said amplifier to automatically control its gain.

References Cited in the file of this patent

UNITED STATES PATENTS 2,888,514 Pritchard ______________ May 26, 1959